United States Patent [19]

Pottharst et al.

[11] Patent Number: 4,838,651

[45] Date of Patent: Jun. 13, 1989

[54] PROJECTION TUBE HAVING AN INSULATING LAYER OF MAGNESIUM OXIDE AND A HIGH TRANSMISSION METAL GRATING

[75] Inventors: Jürgen Pottharst, Stuttgart; Kurt M. Tischer, Wendlingen, both of Fed. Rep. of Germany

[73] Assignee: Nokia Graetz GmbH, Stuttgart, Fed. Rep. of Germany

[21] Appl. No.: 126,658

[22] Filed: Dec. 1, 1987

[30] Foreign Application Priority Data

Dec. 11, 1986 [DE] Fed. Rep. of Germany ....... 3642321

[51] Int. Cl.$^4$ .............. G02F 1/13; H01J 29/12; H04N 5/74
[52] U.S. Cl. .............. 350/331 R; 350/339 R; 350/345; 313/465; 358/236
[58] Field of Search ............. 350/331 R, 339 R, 345, 350/337; 313/398, 465, 399; 358/236, 234, 40

[56] References Cited

U.S. PATENT DOCUMENTS

| | | | |
|---|---|---|---|
| 3,293,474 | 8/1963 | Gibson | 313/398 |
| 3,825,791 | 7/1974 | Kazan | 313/398 |
| 3,908,148 | 9/1975 | Lehrer et al. | 313/398 |
| 3,982,150 | 9/1976 | Mossman | 313/398 |
| 4,683,398 | 7/1987 | Vriens et al. | 313/474 |
| 4,744,636 | 5/1988 | Haven et al. | 350/331 R |

FOREIGN PATENT DOCUMENTS 0144254 12/1978 Japan ......................... 313/398

OTHER PUBLICATIONS

D. A. Haven, "Electron-Beam Addressed Liquid Crystal Light Valve", IEEE Transaction on Electronic Devices, vol. ED-30, No. 5, May 1983.

I. F. Chang "Electron Beam Addressable Liquid Crystal Display with Storage Capability" IBM Tech. Disclosure Bulletin, vol. 16, No. 1, pp. 353, June 1973.

*Primary Examiner*—Stanley D. Miller
*Assistant Examiner*—Huy Kim Mai
*Attorney, Agent, or Firm*—Peter C. Van Der Sluys

[57] ABSTRACT

A projection tube includes a liquid crystal cell having liquid crystal material sandwiched between two plates. The cell is addressable by an electron beam and serves as a light valve for plane-parallel light with which the projection tube is illuminated from behind. On the side facing the liquid crystal material, the plate on which the electron beam writes has dot coatings of indium-tin oxide to achieve a high resolution and a sharp definition of the image to be displayed on a screen. The side of the plate on which the electron beam writes has an insulating layer of magnesium oxide.

5 Claims, 2 Drawing Sheets

PROJECTION TUBE HAVING AN INSULATING LAYER OF MAGNESIUM OXIDE AND A HIGH TRANSMISSION METAL GRATING

BACKGROUND OF THE INVENTION

1. Field of the Invention

The present invention relates to a projection tube with a liquid crystal cell.

2. Description of the Prior Art

DE-OS No. 33 37 350 discloses a projection tube, comprising an electron-beam-addressed liquid crystal cell having liquid crystal material sandwiched between two plates. The first plate is also the faceplate of the projection tube. The second plate is written on by an electron beam. The projection tube is used in a projection system for a large-area display of such things as television pictures.

SUMMARY OF THE INVENTION

An objective of the present invention is to provide a projection tube having high resolution and sharpness.

This objective is attained by the above-described prior art device wherein the second plate has dot coatings of electrically conductive and transparent material on its surface facing the liquid crystal material and an insulating layer of magnesium oxide on its surface that is written on by the electron beam. The dot coatings are made of indium-tin oxide and are arranged in the form of rows and columns. The insulating layer is formed by vapor-depositing magnesium oxide and may have disposed in front of it a high-transmission metal grating.

DESCRIPTION OF THE PREFERRED EMBODIMENT

Figure 1:
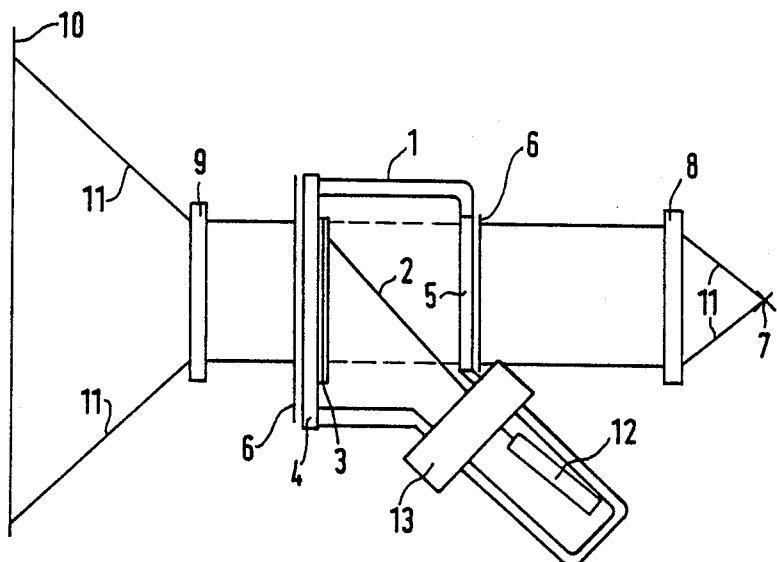
FIG. 1 is a schematic side view of a projection system.

A projection system shown in FIG. 1 includes a projection tube 1 with a liquid crystal cell 3 which is addressable by an electron beam 2. Polarizing sheets 6 are attached to a faceplate 4 and a rear entrance window 5. The projection tube 1 is illuminated with plane-parallel light from a light source 7 provided with a polarizer 8. The light emitted by the projection tube 1 passes through an optical magnifying device 9 to a screen 10.

Light beams 11 emanating from the light source 7 are shown in their most divergent positions. The electron beam 2 scans the liquid crystal cell 3 line by line, driving it in accordance with a video signal applied to an electron gun 12. To deflect the electron beam 2, a deflection system 13 is mounted on the projection tube 1. An electron gun required to erase the addressing of the liquid crystal cell 3 is not shown in FIG. 1 for the sake of clarity.

Figure 2:
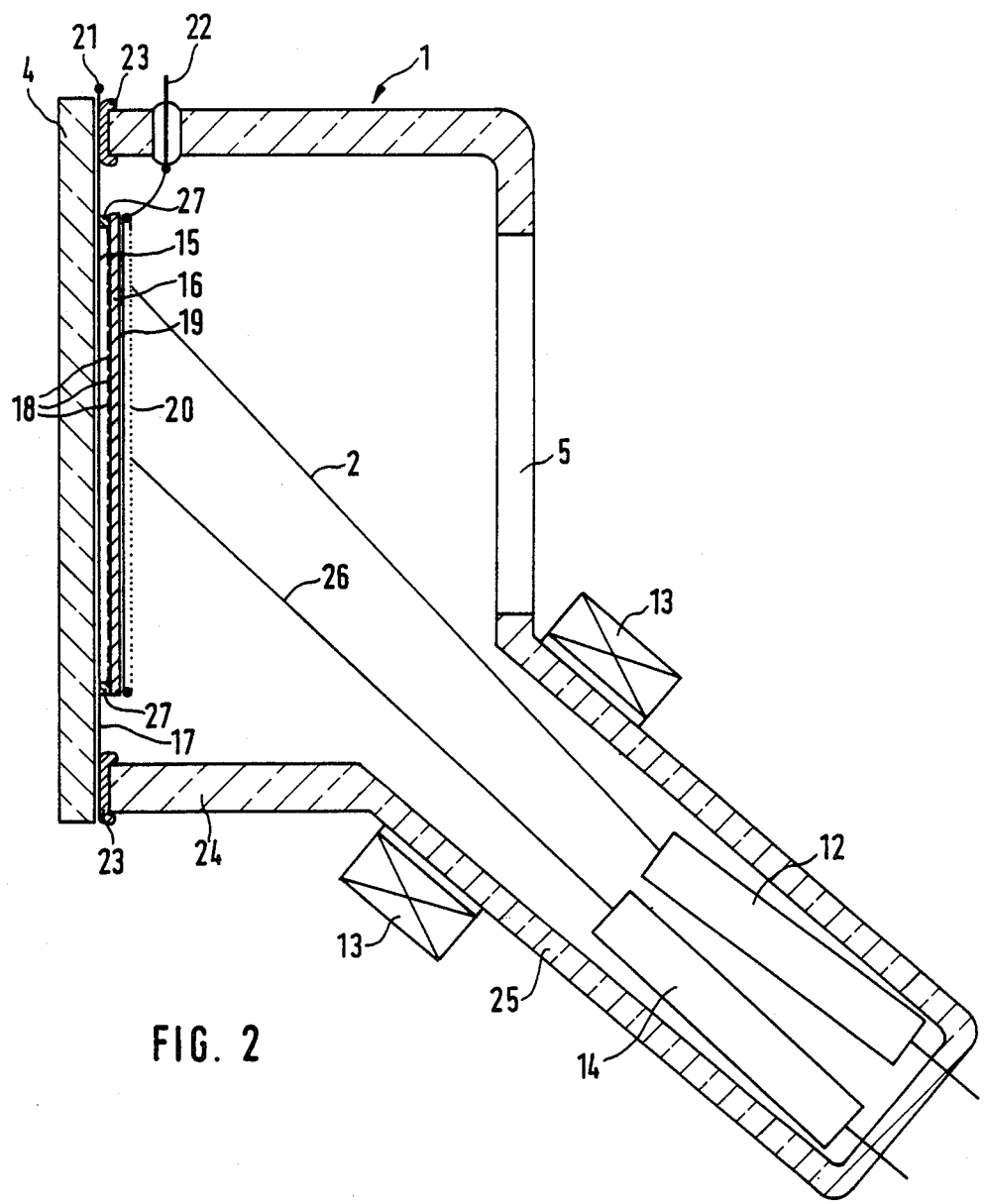
FIG. 2 is a vertical section through the projection tube of the projection system of FIG. 1.

An electron gun which produces an electron beam for erasing the addressing of the liquid crystal cell is shown in the sectional view of FIG. 2, where it is designated 14; the electron beam produced by it is designated 26.

FIG. 2 shows the liquid crystal material 15 of the liquid crystal cell 3 enclosed between two plates and a frame 27. A first plate is formed by the faceplate 4 of the projection tube 1. On the surface of the faceplate 4 facing the liquid crystal 15, a transparent coating 17 of indium-tin oxide (ITO) is deposited. The faceplate 4 is connected by a conventional frit joint 23 to a bulb 24, which has an inclined neck 25.

A second plate 16 adjoining the liquid crystal material 15 is a thin, plane-parallel glass plate. On the surface of this plate 16 facing the liquid crystal material 15, dot coatings 18 of an electrically conductive and transparent material are deposited, as will be described in detail below.

The surface of the plate 16 on which the electron beam 2 writes is provided with a transparent insulating layer 19 which has a high secondary-emission ratio. The insulating layer 19 is, for example, a magnesium-oxide layer which is preferably deposited by evaporation. To exclude any reaction of secondary electrons, a high-transmission metal grating 20 may be disposed in front of the insulating layer 19. The layer on the faceplate 4 and the insulating layer 19 with the metal grating 20 are provided with outwardly protruding connection contacts 21 and 22, respectively.

The projection tube 1 is operated in the usual manner.

Figure 3:
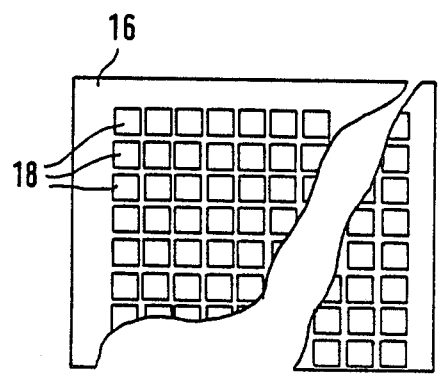
FIG. 3 is a top view of one of the plates between which a liquid crystal cell in the projection tube is sandwiched.

FIG. 3 shows the surface of the plate 16 facing the liquid crystal material. This representation clearly shows the dot coatings 18 on the plate 16. The individual coatings are arranged in the form of rows and columns. They are, for example, 0.100 mm square and are spaced 0.01 mm apart. The material of the coatings 18 is indium-tin oxide (ITO).

By the use of an insulating layer 19 of magnesium oxide on the surface facing the electron beam 2, high secondary emission is achieved which causes fast and reliable turnon of the liquid crystal material 15 in the respective area. Through the use of dot coatings 18 on the surface of the plate 16 facing the liquid crystal material 15, a very high resolution and a very sharp definition of the picture to be displayed are achieved. As a result, this projection tube 1 is also suitable for use in a projection system for displaying television pictures in a high-definition television system.

What is claimed is:

1. A projection tube, comprising:
   an electron-beam-addressed liquid crystal cell having liquid crystal material sandwiched between first and second plates, the first plate forms a faceplate for the projection tube, and the second plate is written on by an electron beam;
   dot coatings of electrically conductive and transparent material are formed on a surface of the second plate facing the liquid crystal material; and
   an insulating layer of magnesium oxide is formed on a surface of the second plate that is written on by the electron beam.

2. A projection tube as claimed in claim 1, wherein the dot coatings are made of indium-tin oxide.

3. A projection tube as claimed in claim 2, wherein the dot coatings are arranged in the form of rows and columns.

4. A projection tube as claimed in claim 1, wherein the insulating layer is made of vapor-deposited magnesium oxide.

5. A projection tube as claimed in claim 1, additionally comprising a high transmission metal grating disposed between the insulating layer and the electron beam.

* * * * *